US011521359B2

(12) United States Patent
Noorkami et al.

(10) Patent No.: US 11,521,359 B2
(45) Date of Patent: Dec. 6, 2022

(54) EXTENDED REALITY RECORDER

(71) Applicant: Apple Inc., Cupertino, CA (US)

(72) Inventors: Maneli Noorkami, Cupertino, CA (US); Ranjit Desai, Cupertino, CA (US); Perry A. Caro, San Jose, CA (US); Joel N. Kerr, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/184,585

(22) Filed: Feb. 24, 2021

(65) Prior Publication Data

US 2021/0327145 A1 Oct. 21, 2021

Related U.S. Application Data

(60) Provisional application No. 63/011,969, filed on Apr. 17, 2020.

(51) Int. Cl.
*G06T 19/00* (2011.01)
*G06T 17/20* (2006.01)
*G06T 19/20* (2011.01)
*G06V 20/00* (2022.01)

(52) U.S. Cl.
CPC ............ *G06T 19/006* (2013.01); *G06T 17/20* (2013.01); *G06T 19/20* (2013.01); *G06V 20/00* (2022.01)

(58) Field of Classification Search
None
See application file for complete search history.

(56) References Cited

U.S. PATENT DOCUMENTS

| 9,342,929 B2 | 5/2016 | Kamuda et al. |
| 2013/0222369 A1* | 8/2013 | Huston ................. G06T 19/006 345/419 |
| 2017/0337352 A1 | 11/2017 | Williams |
| 2018/0190032 A1 | 7/2018 | Barnett et al. |
| 2019/0019011 A1 | 1/2019 | Ross et al. |
| 2019/0232500 A1 | 8/2019 | Bennett et al. |
| 2020/0043237 A1 | 2/2020 | Desai et al. |
| 2020/0066022 A1 | 2/2020 | Leong et al. |
| 2021/0073357 A1 | 3/2021 | Desai |

OTHER PUBLICATIONS

International Search Report and Written Opinion from PCT/US2021/023833, dated Jul. 8, 2021, 22 pages.

* cited by examiner

*Primary Examiner* — Nicholas R Wilson
(74) *Attorney, Agent, or Firm* — BakerHostetler

(57) ABSTRACT

Implementations of the subject technology provide systems and methods for recording an extended reality experience in a way that allows the experience to be played back at a later time from a different viewpoint or perspective. This allows computer-generated content that was rendered for display to a user during the recording, to be re-rendered during playback at the correct time and location in the recording, but from a different perspective. In order to facilitate this type of viewer-centric playback, the recording includes a computer-generated content track that references resources for re-rendering the computer-generated content at each point in time in the recording.

25 Claims, 12 Drawing Sheets

EXTENDED REALITY RECORDER

CROSS REFERENCE TO RELATED APPLICATIONS

This application claims the benefit of priority to U.S. Provisional Patent Application No. 63/011,969, entitled "Computer-Generated Reality Recorder," filed on Apr. 17, 2020, the disclosure of which is hereby incorporated herein in its entirety.

TECHNICAL FIELD

The present description relates generally to extended reality environments.

BACKGROUND

Augmented reality technology aims to bridge a gap between virtual environments and a physical environment by providing an enhanced physical environment that is augmented with electronic information. As a result, the electronic information appears to be part of the physical environment as perceived by a user. In an example, augmented reality technology further provides a user interface to interact with the electronic information that is overlaid in the enhanced physical environment.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
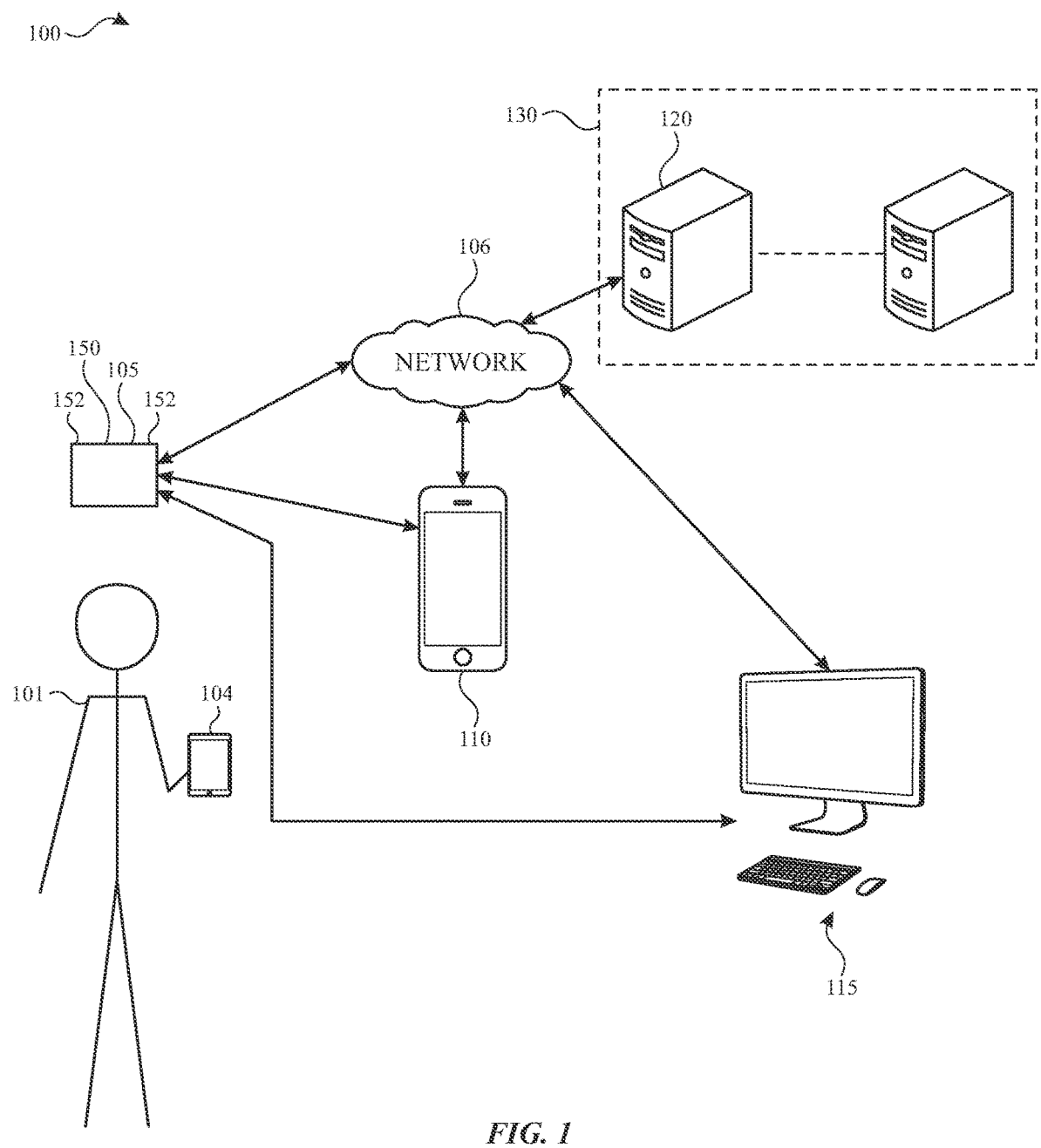
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide an XR system that provides recording, storage, editing, management, and playback of extended reality (XR) recordings to facilitate re-viewing of an XR experience from a different viewpoint in the XR environment. In an example, time-ordered three-dimensional (3D) information (e.g., depth information from one or more depth sensors) about the physical environment in which a device is located is captured over a period of time for extended reality recording of an experience. Over substantially the same period of time, video and/or audio content (e.g., including spatial audio content) can be captured and/or displayed by the device. Over substantially the same period of time, computer-generated (CG) content is generated and displayed over a portion of a view of the environment. CG content corresponding to the CG content that is displayed during the period of time is also captured as time-ordered CG content, and stored aligned in time with the time-ordered three-dimensional (3D) information (e.g., including depth information), metadata including information about the scene, the video and/or the audio. The CG content corresponding to the CG content that is displayed during the period of time, and that is captured by the XR system, can include a scene graph, the 3D geometries, textures, materials, animations etc. of CG content that is displayed during the period of time, and/or 3D geometries, textures, materials, animations etc. of CG content that would have been displayed during the period of time if the recording user had been looking in other directions or locations in the scene during the period of time, so that the XR recording can be played back from any point of view.

During the period of time of recording (e.g., live, or online) and/or after the recording (e.g., offline), a three-dimensional reconstruction of the physical environment can also be generated (based on the depth information, the video, the audio, and/or other sensor data), the 3D reconstruction can be stored, and, in some examples, a time-ordered reconstruction track can also be stored, aligned in time with the time-ordered CG content, the time-ordered three-dimensional (3D) information, the metadata, the video and/or the audio.

When it is desired to play back a recorded XR experience, the 3D reconstruction, the CG content track, and/or the metadata track (e.g., including recorded audio, video, and/or depth information) are used to render a view of the recorded XR experience based on a playback time, and a current position and/or viewpoint of the device displaying the playback. In this way, the viewer of the playback is able to experience the recorded experience from any of one or more multiple viewpoints in the XR environment.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, an electronic device 110, an electronic device 115, and a server 120. For explanatory purposes, the system architecture 100 is illustrated in FIG. 1 as including the electronic device 105, the electronic device 110, the electronic device 115, and the server 120; however, the system architecture 100 may include any number of electronic devices and any number of servers or a data center including multiple servers.

The electronic device 105 may be a smartphone, a tablet, or a head mountable portable system (e.g., a head mountable display device that can be worn by a user), that includes a display system capable of presenting a visualization of an extended reality environment to the user. The electronic device 105 may be powered with a battery and/or another power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use a handheld electronic device 104, such as a tablet, watch, mobile device, and the like.

The electronic device 105 may include one or more cameras such as camera 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for initiating recording within a given extended reality environment. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect a presence of a person or object and/or an occurrence of an event in a scene to initiate recording within the extended reality environment.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the generated extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

In an implementation, the electronic device 105 generates a recording of a physical environment and generates an extended reality environment including two-dimensional (2D) video for sharing and playback. For example, when users are using device that can capture the scene from more than one point of view (e.g., a smartphone, tablet device, or head mountable device (HMD) with multiple camera sensors), the users might want to capture or stream their experiences to someone else or re-live the experience themselves from another perspective. This experience can be a purely VR or AR experience or a mixed reality (MR) experience. However, if only a 2D video is recorded, or if insufficient information is captured and stored, the recording may only be playable from the perspective of the recorder, and the viewer may feel VR discomfort. Traditional video recording methods cannot be used to generate the desired 3D capture.

In accordance with aspects of the disclosure, systems and methods for recording and playback of XR experiences are provided that let the viewer control the playback viewing experience.

In an implementation, the electronic device generates a recording that includes video, audio, three-dimensional information for an environment around the electronic device 105, and information indicating what computer-generated content was displayed by the electronic device 105 during the recording and what computer-generated content that was out of the field of view of the recording user during the recording, but would have been displayed during the recording had the recording user been looking in a different direction or at a different location in the scene during the recording. The information can include 3D computer generated content captured by the electronic device 105, such as (but not limited to) the scene data, geometries, textures, material, animation, physics, etc. Electronic device 105 concurrently or subsequently generates a three-dimensional (3D) reconstruction of some or all of the environment, merging information from camera 150, sensors 152, and/or information from other recordings (e.g., from different point of views (POVs) and/or different fields of view (FOVs), such as from other users' devices and/or other cameras). It is further appreciated that the electronic device 110 and/or the electronic device 115 can also generate such extended reality environments either working in conjunction with the electronic device 105 or independently of the electronic device 105.

The electronic device 105 may also detect events that have occurred within the scene of the extended reality environment. Examples of such events include detecting a presence of a particular person, entity, or object in the scene. In response to the detected event, the electronic device 105 can store annotations (e.g., in the form of metadata) in a recording of an XR experience.

The network 106 may communicatively (directly or indirectly) couple, for example, the electronic device 105, the electronic device 110 and/or the electronic device 115 with the server 120. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic device discussed below with respect to t FIG. 7. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 7.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

In an implementation, the server 120 may provide a secure environment corresponding to a secure cloud environment discussed further below for generating, storing, editing, and/or analyzing a recording of a three-dimensional XR experience including CG content. Such a recording, or information for generating such a recording, may be provided by at least one of the electronic device 105, the electronic device 110, and/or the electronic device 115. Similarly, the electronic device 105, the electronic device 110, and/or the electronic device 115 may also provide a secure environment for generating, storing, editing, and/or analyzing a recording of an extended reality experience including CG content as discussed further below in FIG. 2.

Figure 2:
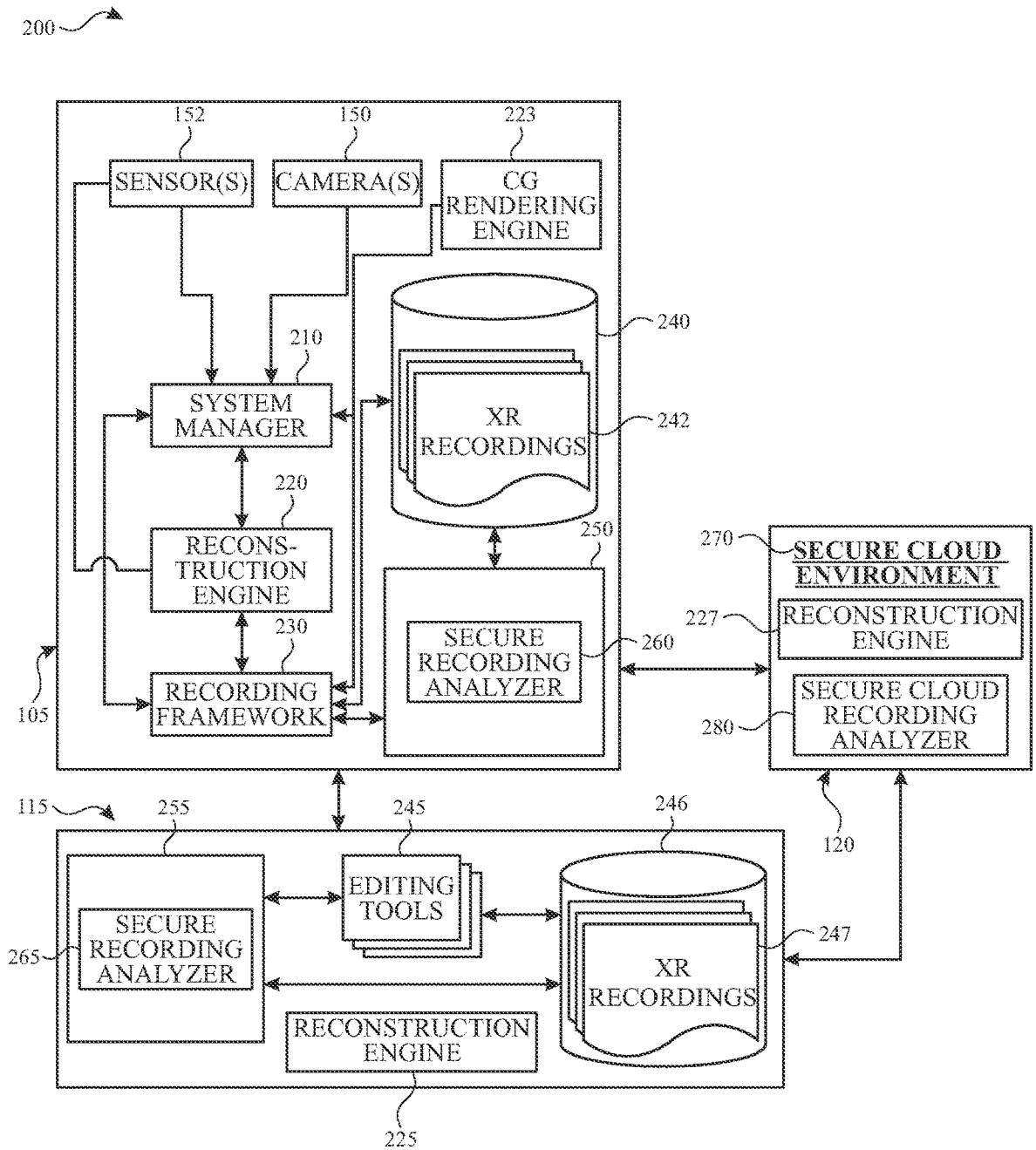
FIG. 2 illustrates an example software architecture that may be implemented in accordance with one or more implementations of the subject technology.

FIG. 2 illustrates an example software architecture 200 that may be implemented on the electronic device 105, the electronic device 115, and/or the server 120 in accordance with one or more implementations of the subject technology. For explanatory purposes, the software architecture 200 is described as being implemented by the electronic device 105, the electronic device 115, and the server 120 of FIG. 1, such as by a processor and/or memory of the electronic device 105, electronic device 115, and the server 120; however, appropriate portions of the software architecture 200 may be implemented by any other electronic device, including the electronic device 110. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The software architecture 200, as implemented on the electronic device 105, includes a framework. A framework, as used herein, can refer to a software environment that provides particular functionality as part of a larger software platform to facilitate development of software applications, and may provide one or more application programming interfaces (APIs) that may be utilized by developers to design, in a programmatic manner, extended reality environments and to handle operations for such extended reality environments.

As illustrated, a recording framework 230 is provided. The recording framework 230 may provide functionality to record an extended reality environment provided by the input modalities as discussed above. A reconstruction engine 220 is provided that receives information corresponding to input from the various input modalities. A system manager 210 is provided to monitor resources from the electronic device 105 and determine a quality of service metric based on available resources.

In an implementation, the software architecture 200 enables generating, editing, and/or playback of XR recordings and may provide a repository or storage location to upload such recordings. As illustrated in FIG. 2, the electronic device 105 includes a database 240 for storing XR recordings 242, which may be provided by the recording framework 230 and/or a secure environment 250 discussed further below. The recording framework 230, in an example, may generate an XR recording and encrypt such a recording for storing in the database 240.

As further shown, the electronic device 105 includes a secure environment 250. A secure environment, as used herein, provides a secure computing environment that is isolated from other processes executing on a given processor of a particular device (e.g., the electronic device 105) where the secure environment is inaccessible to both the processor executing the other processes and the other processes themselves. Further, the secure environment encrypts any portion of memory that it utilizes and may utilize a separate processor (e.g., a custom security-oriented processor) than the processor that is executing such other processes (e.g., on the electronic device 105). The secure environment may also use homomorphic encryption when processing a given XR recording. Additionally, the secure environment may be enabled to decrypt encrypted XR recordings stored in any one of the electronic devices shown in FIG. 1.

Implementations of the software architecture 200, and components thereof, enable recording of extended reality experiences, also referred to as XR experiences, that include rendered CG content (e.g., rendered for display during recording by computer-generated (CG) rendering engine 223).

Implementations of the software architecture 200, and components thereof, may also enable the automatic segmenting of XR recordings based on content and annotations which also enables the recordings to be searchable. Further, the software architecture 200, and components thereof, enables recommendations to other recordings to be provided based at least in part on a topic and/or interest of a user, which may be provided in a user preference stored in an associated user profile. The software architecture 200, and components thereof, enable multiple recordings to be generated based on recommendations or based on user preferences, and also enable random browsing of recordings (pause, playback, seek, etc.).

In an example, the secure environment 250 may receive a given XR recording from the recording framework 230, or receive a request from the recording framework 230 to retrieve the XR recording stored in the database 240. As illustrated, the secure environment 250 includes a secure recording analyzer 260 that analyzes recordings and generates metadata and/or annotations based on the analysis. The secure recording analyzer 260, in an implementation, can execute specific classifiers for object detection, and determine motion vectors of objects if such objects are moving during the recording. In an example, such motion vectors may be utilized to track objects and/or predict where the objects may be moving toward. The secure recording analyzer 260 provides annotations of the recording (e.g., tagged with metadata information) to objects and to detected events and/or recognized persons. In another example, the secure recording analyzer 260 determines acoustic information about a person or object from speech, voices, and/or audio which may be used for movement or location tracking and/or recognition of the person or object. Further, the analysis can also be tailored depending on type of recording (e.g., sports, particular location such as the beach, etc.) to target specific events or objects that are likely to be present in the type of recording.

As also shown, the server 120 provides reconstruction engine 227. In some implementations, three-dimensional information captured by camera 150 and/or sensors 152 can be provided to server 120 for generation of a 3D reconstruction of the environment. The 3D reconstruction of the environment generated by reconstruction engine 227 (and/or by reconstruction engine 220 of electronic device 105 and/or by reconstruction engine 225 of electronic device 115) can be stored (e.g., in an XR recording), aligned in time with a recorded CG content track, a recorded video track, a recorded audio track, and/or a recorded metadata track.

Server 120 may also include a secure cloud environment 270, which corresponds to a particular type of secure environment in an implementation. For instance, the secure cloud environment 270 supports a set of processor instruction codes that enables user-level code to allocate private regions of memory (e.g., enclaves) that are protected and isolated from other processes. The secure cloud environment 270 may use its own set of processors (e.g., CPU and/or GPU). In an implementation, the server 120 includes a secure cloud recording analyzer 280 which performs the same or similar functionality to the secure recording analyzer 260 discussed above on a given recording. In one example, the server 120 may receive a request from the electronic device 105 to perform an analysis of a given recording. The results of any analysis (e.g., generated metadata information or recommendations) performed by the secure recording analyzer 260 can be returned to the electronic device 105 for further processing.

In an implementation, the electronic device 115 includes a secure environment 255 with a secure recording analyzer 265, each of which may respectively perform the same functionality as described above in connection with the secure environment 250 and the secure recording analyzer 260 of the electronic device 105. For example, the secure recording analyzer 260 may analyze an XR recording from one of the XR recordings 247 stored in a database 246.

As illustrated, the electronic device 115 includes a set of tools 245 that correspond to various editing tools (e.g., specific applications) that provide editing functionality to modify XR recordings. Each editing tool may be capable of receiving an XR recording (e.g., corresponding to one of the XR recordings 247 stored in a database 246) for editing. Examples of an editing tool include an image editor, a tool for 3D composition, and/or a multimedia editor that enables organization of XR content along a timeline. A given editing tool may also enable modification of CG content that was rendered during recording. A given editing tool may also enable modification of 3D reconstruction of an environment (e.g., to fill missing physical environment structures or geometries). A given editing tool may also enable insertion of new objects or content into a scene, including new virtual content.

Although not illustrated in FIG. 2, it is appreciated that the electronic device 110 may also include similar components as those discussed in connection with the electronic device 115 above.

Figure 3:
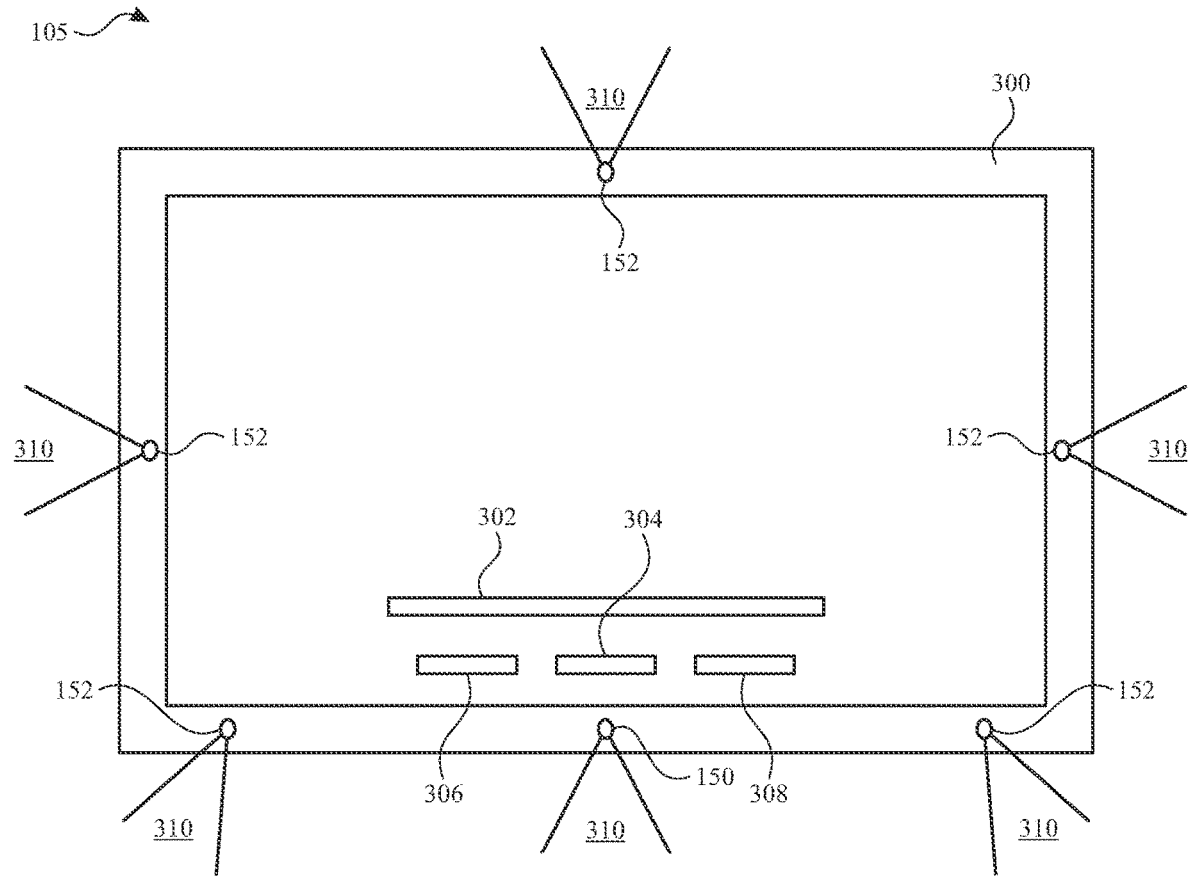
FIG. 3 illustrates additional features of an electronic device in accordance with implementations of the subject technology.

FIG. 3 illustrates a schematic top view of electronic device 105 illustrating how sensors 152 may be positioned at various locations on or within a body 300 of electronic device 105. For example, sensors 152 and/or one or more cameras such as camera 150, each having a field of view 310 may be positioned to enable capture of three-dimensional information (e.g., depth information) that covers substantially the entire environment around electronic device 105 (e.g., including in a direction behind the wearer). Moreover, three-dimensional information captured by camera 150 and/or sensors 152 at various times (e.g., as the wearer moves within and/or looks around the environment during a continuous or discontinuous recording of the XR experience and/or using information captured by camera 150, sensors 152, and/or other devices or cameras during continuous or discontinuous times before, during, or after the recording of the XR experience) can be integrated to build a 3D reconstruction of the environment.

In the example of FIG. 3, electronic device 105 includes a display 302 having a arranged to provide display images to the user to generate a three-dimensional view of an XR scene. Processing circuitry 306 (e.g., one or more processors and memory for generating, rendering, recording, and/or otherwise processing XR recordings and experiences, one or more internal sensors 304 such as IMUS, and/or one or more power sources such as a battery 308) can also be provided in electronic device 105.

Moreover, in circumstances in which multiple electronic devices 105 are able to capture 3D information describing a common environment, the 3D information from the multiple electronic devices 105 can be combined to generate a 3D reconstruction of an environment in which an XR experience is being recorded.

Figure 4:
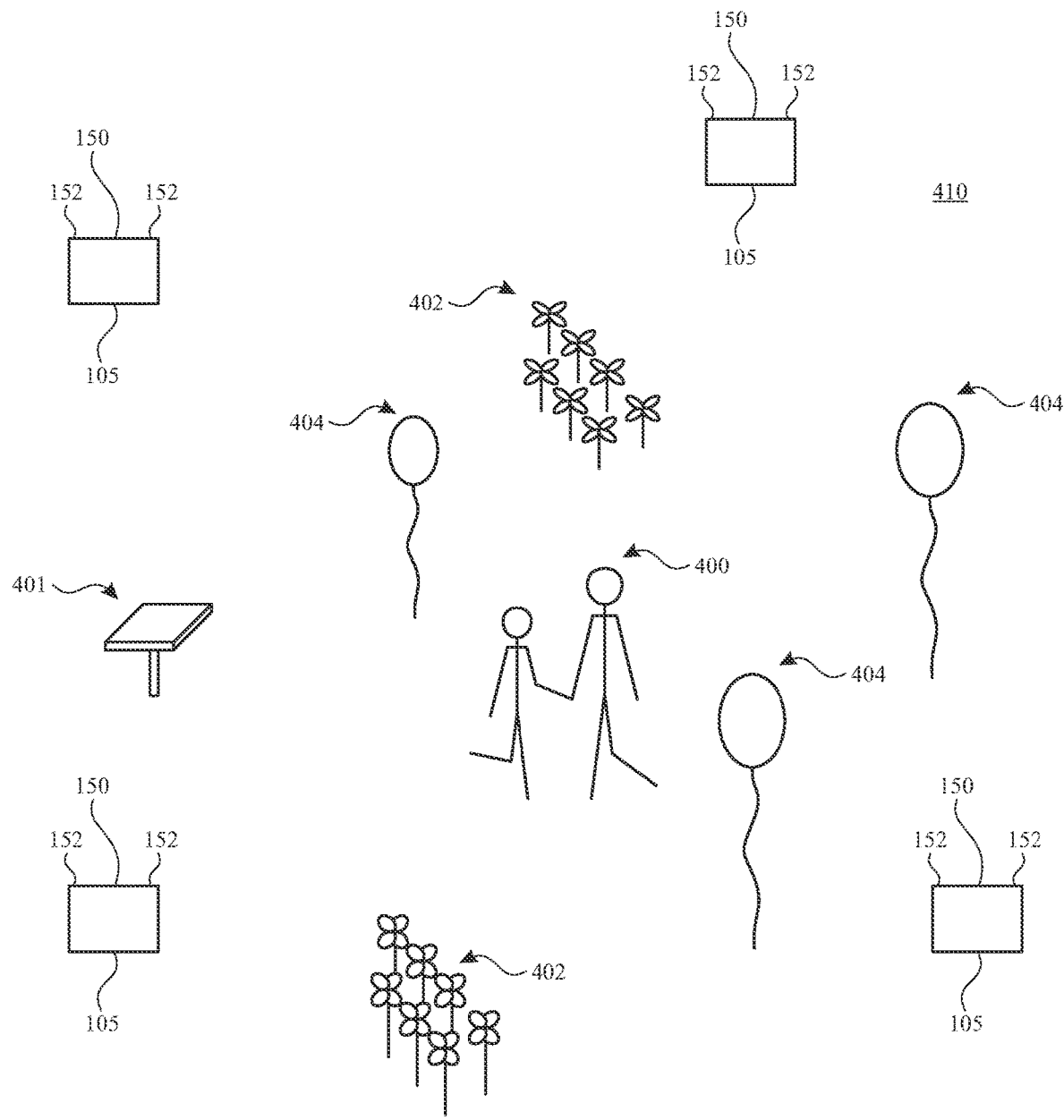
FIG. 4 illustrates multiple electronic devices capturing an experience in an environment in accordance with implementations of the subject technology.

FIG. 4 illustrates an example in which multiple users 101 wearing multiple electronic devices 105 are capturing 3D information describing a physical environment 410. In the example of FIG. 4, the physical environment 410 includes static physical content 401, such as a table, and dynamic physical content 400 such as a dancing couple at a wedding.

For one or more of users 101, the XR environment including physical environment 410 may include rendered computer-generated (CG) content such as static CG content 402 (e.g., virtual flowers, rendered and displayed to appear as though they are growing out of the physical floor) and/or dynamic CG content 404 such as one more virtual balloons floating around the real dancing couple. The static CG content 402 and/or the dynamic CG content 404 can be displayed to any or all of the one or more users 101, can be the same for all users, and/or can be different for different users. Some of the users 101 may be using an electronic device 105 only to view the XR environment with CG content added to the physical scene with the dancing couple. Others of the users 101 may be recording the version of the XR experience being generated by their electronic device 105. Any or all of the electronic devices 105 can share 3D geometry information for the environment with any or all of the other electronic devices 105 (e.g., directly or via network 106 and/or server 120). One or more of the electronic devices 105 can also, or alternatively, accumulate a history of 3D geometry information that can be combined to fill in various spatial portions of the 3D reconstruction that are not all visible to an electronic device 105 at one time. Users 101 may opt in to share their recorded content of a jointly attended event and/or a user may be able to access content recorded by other trusted devices, such as devices of other users in the same family (or devices associated with the same user account).

When three-dimensional geometry information and/or video information from multiple devices is used to reconstruct a physical environment, the information from each device can be stitched together with the information from one or more other devices. In one example, one or more objects identified by one electronic device 105 can be matched to one or more corresponding objects identified by another electronic device 105 to identify overlapping portions of the feeds from the two electronic devices for stitching of three-dimensional geometry information and/or video information. In another example, if a first electronic device 105 is visible in a feed of a second electronic device 105, the perspective of the second electronic device 105 can be inferred by the first electronic device 105 to co-locate recorded three-dimensional geometry information and/or video information from the two systems for stitching. In another example, one or more of electronic device 105 can use ranging sensors to establish their positions relative to one another in order to co-locate the recorded three-dimensional geometry information and/or video information from the two systems for stitching. Electronic devices 105 can activate ranging of other electronic devices 105 when one or more other electronic devices 105 is detected in proximity or ranging can be activated as an option or by default during XR recording.

As described in further detail herein, the disclosed systems and methods allow a recording of the XR experience of the wearer watching the dancing couple, including the added CG content, in a way that allows a later viewer to playback the experience from any location or viewpoint, and/or to move and/or look around the recorded scene. For example, because a 3D reconstruction of the environment has been generated, and time-ordered aspects of the 3D reconstruction have been stored aligned in time with time-ordered information for the CG content that was displayed during the recording, the later viewer can walk around the recorded dancing couple to view the recorded dance from the other side of the room. As another example, the later viewer, while viewing the 3D reconstruction of physical environment 410 (e.g., while virtually standing in physical environment 410) can pause the recorded action (e.g., pause the motion of the dancing couple and the floating of the virtual balloons), move to a new location relative to the paused dancing couple and virtual balloons, and then resume the playback of the dancing couple and the virtual balloons, but from a different perspective or viewpoint.

In order to facilitate this type of three-dimensional and/or interactive re-experience of a captured experience, the systems and methods disclosed herein provide time-ordered three-dimensional capture of an experience, such as an XR experience that includes real and virtual content. For example, in accordance with aspects of the disclosure, rather than recording the rendered content for later playback, the virtual 3D geometries and reconstructed MR geometries are captured so that, during playback, the experience can be re-rendered from the viewer's own perspective. Along with the 3D geometries, video, audio, and metadata can also be recorded. For example, recorded video can be used to inform the 3D reconstruction, during recording, and/or in post processing of the recording. In some circumstances, multiple video tracks can be used together to render the content from different perspectives. Audio content can be recorded in a spatial format so that, during playback, the audio aspects of the recorded experience can also be rendered based on the viewer's/listener's position. Metadata can also be generated and/or stored to provide information about the recorded content, and/or parameters that were used for creating some of the 3D assets. This capture can be imported to an editing tool to improve and modify the capture, and the output can be exported to a format that can be re-experienced by the viewer from their perspective.

Figure 5:
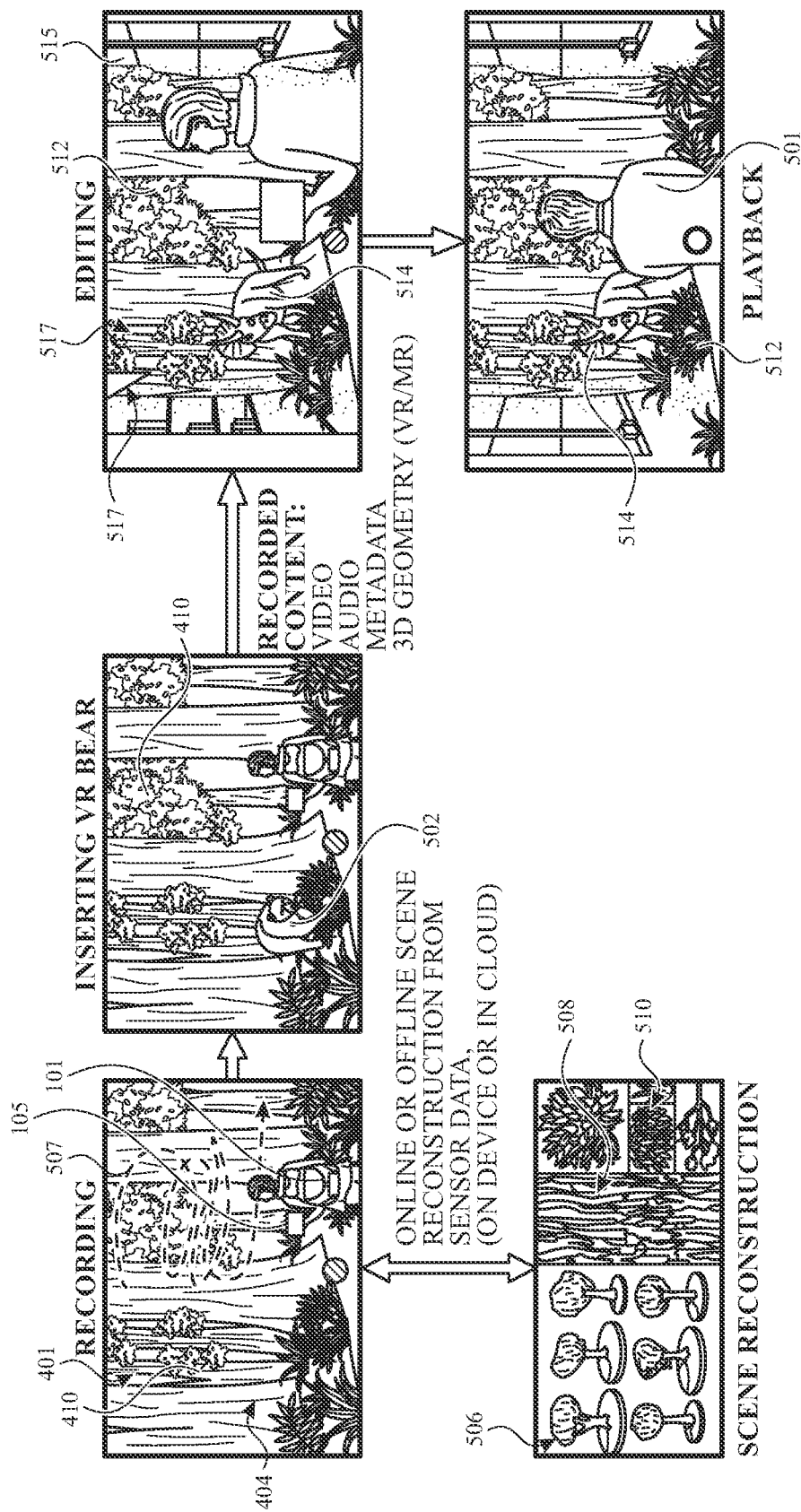
FIG. 5 illustrates various stages of recording, editing, and playing back an extended reality experience in accordance with implementations of the subject technology.

FIG. 5 illustrates various aspects of recording, editing, and playback of an XR experience. As shown in FIG. 5, during recording, a user 101 wearing an electronic device 105 can walk (e.g., as indicated by arrow 507) around a physical environment 410, such as a forest with static physical content 401 such as tree trunks, and dynamic physical content 400 such as bushes that can blow in the wind. As user 101 walks around physical environment 410, 3D information (e.g., depth information) for the environment, along with audio and/or video of the environment is recorded. During recording, and while user 101 is walking around physical environment 410, computer-generated (CG) content 502 (e.g., a virtual bear) may be rendered by electronic device 105 and displayed over a portion of the user's view (e.g., a direct view through a transparent or translucent display or a pass-through video view) of the physical environment 410.

As indicated in FIG. 5, the recorded video, audio, 3D information for physical environment 410, and information associated with the rendered CG content 502 can be provided to an editing tool. If a 3D reconstruction of the environment was generated during or after the recording with the electronic device 105, the 3D reconstruction can be provided to the editing tool (for editing) with the recorded video, audio, 3D information for physical environment 410, and information associated with the rendered CG content 502. In other implementations, the 3D reconstruction can be generated by an editing tool based on the recorded 3D information for the environment. The 3D reconstruction can be stored independently of time, and/or a reconstruction track for the recording can be generated that includes information for the 3D reconstruction at any particular time of the recording.

As illustrated in FIG. 5, with the editing tool, modifications can be made to the 3D reconstruction 512 (e.g., by filling missing geometry 517) and/or to the recorded content (e.g., by replacing the CG content 502 (the bear) that was rendered during recording with modified CG content 514 such as a dinosaur, and/or by adding additional CG content 515 that was not rendered during recording).

As illustrated in FIG. 5, another user 501 can then playback the recorded XR experience including the reconstructed 3D environment, the modified CG content 514, and the additional CG content 515, but from a new and/or changing perspective.

FIG. 5 also indicates that performing scene reconstruction can occur at electronic device 105 (e.g., during or after recording) and can include obtaining one or more meshes 506, textures 508 or 510, and/or materials from a reconstruction library, based on the 3D information from the sensors (e.g., sensors 152) of electronic device 105.

Figure 6:
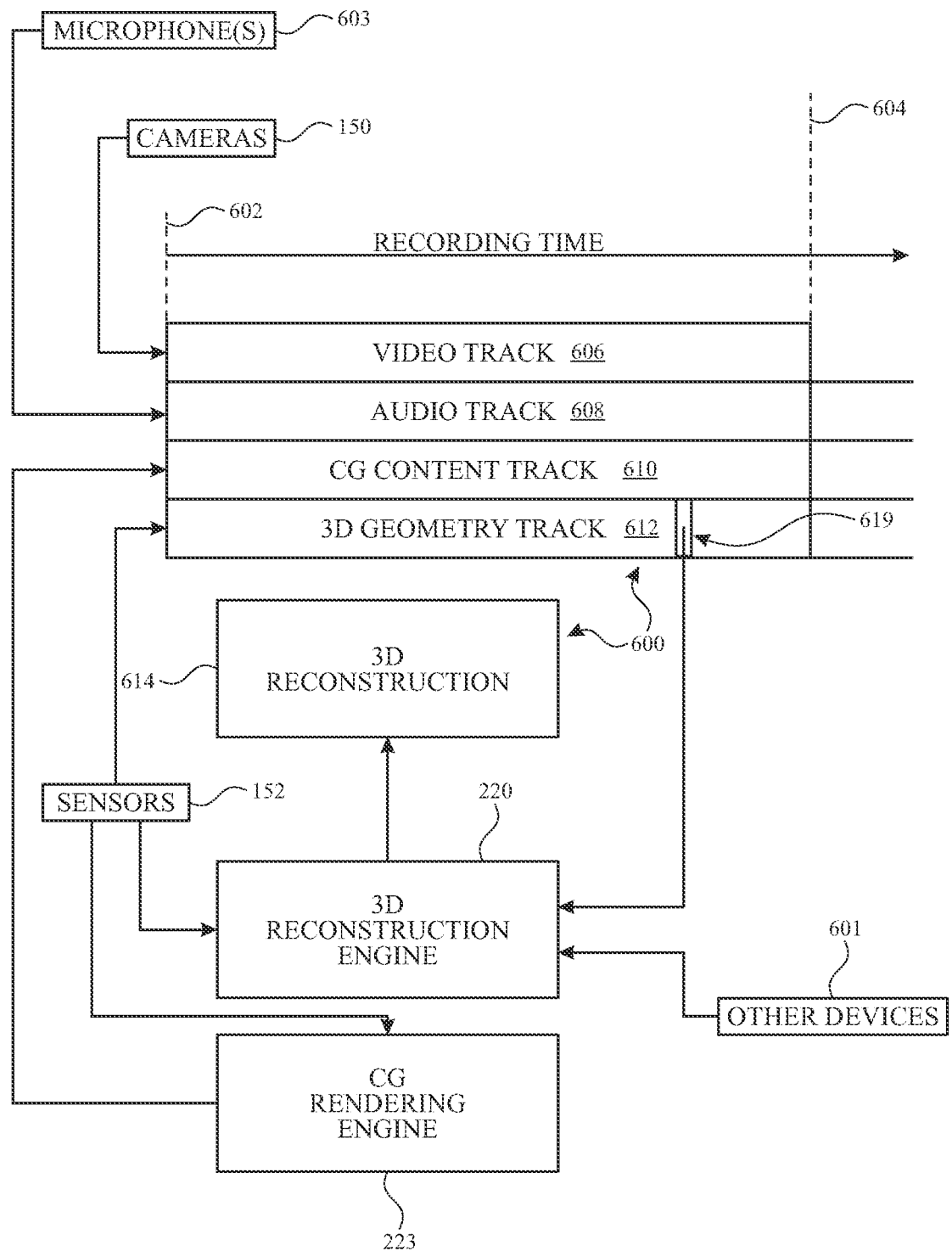
FIG. 6 illustrates example features of a recording of an extended reality experience in accordance with implementations of the subject technology.

FIG. 6 illustrates an XR recording 600 that can be captured by electronic device 105. In the example of FIG. 6, during a period of time (e.g., corresponding to a duration of time after a start time 602) for a recording, camera 150 may provide a video track 606 and microphone(s) 603 (e.g., as part of sensor 152) provide a corresponding audio track for the recording.

CG rendering engine 223 may generate and/or render CG content such as CG content 402 and/or 404 of FIG. 4, and/or 502 of FIG. 5 for display over a view of a portion of a physical environment 410. CG rendering engine 223 (and/or other circuitry of electronic device 105) may also provide a CG content track 610 that indicates the CG content rendered at each time during the recording.

It should be appreciated that the rendered CG content itself is not stored in the CG content track 610. Instead, to allow a viewer of the XR recording 600 to view the experience from any position and/or viewpoint, CG content track 610 includes snapshot frames that indicate scene information at various times during the recording, and delta frames that indicate small changes relative to the CG content indicated by the snapshot frames. In addition, geometries, meshes, textures, materials, and/or locations, for each component in the scene can be recorded as a separate time-ordered track, or in a time-independent file from which they can be pulled for rendering based on the CG content track 610. In this way, when the recording is played back, the CG content can be re-rendered at the correct time and the correct location, but from the perspective of the viewer.

As indicated in FIG. 6, a time-ordered 3D geometry track is also included in XR recording 600. 3D geometry track 612 is generated from raw and/or processed sensor data (e.g., depth data) captured during the recording and stored, aligned in time with the captured video track 606, the captured audio track 608, and the captured CG content track 610. This depth data can be used (e.g., along with the recorded video data and/or audio data), live during the recording or offline after the recording, to reconstruct one or more meshes or point clouds of three-dimensional reconstruction of the scene. In cases in which the three-dimensional reconstruction is generated offline after recording, the 3D geometry track may be stored for later use. In cases in which the three-dimensional reconstruction is generated live during recording, the 3D geometry track 612 may or may not be stored.

As indicated in FIG. 6, either during recording or after, sensor data from sensors 152, image data from camera(s) 150, and/or audio data from microphones 603 is also provided to a 3D reconstruction engine such as reconstruction engine 220 of electronic device 105. 3D reconstruction engine 220 generates a 3D reconstruction 614 based on the provided data. The 3D reconstruction 614 can be represented as one mesh with texture, multiples meshes and textures, or point clouds, etc. This is only one format for the recording, there could be other variations as well. In some circumstances information associated with 3D reconstruction 614 that is time-ordered (e.g., information indicating the three-dimensional shape, texture, material, etc. of dynamic physical entities in the environment such as the dancing couple of FIG. 4, and/or information indicating that one room in a reconstructed building is relevant to one part of the recording, and another room (or an outdoor scene) is relevant to another part of the recording, such as due to the recording user moving from one room to another during the recording). Such time-ordered information associated with the 3D reconstruction can be stored, aligned in time, with the captured video track 606, the captured audio track 608, the captured CG content track 610, and/or the captured 3D geometry track 612. However, it should be appreciated that, in some circumstances, when the 3D reconstruction is generated, the 3D geometry track may no longer be needed and may be discarded or stored separately from XR recording 600.

The 3D reconstruction 614 may include geometries, meshes, textures, materials, and/or locations of objects in physical environment 410 that are present (e.g., at particular times during or throughout) the recording. When the recording is played back, the portion of the 3D reconstruction that is rendered for the viewer can be rendered at the correct time and the correct location, but from the perspective of the viewer at the time of viewing.

FIG. 6 also illustrates how generating a three-dimensional reconstruction 614 may include generating a portion of the three-dimensional reconstruction associated with a location in the scene based on a first portion of the stored time-ordered three-dimensional scene information from a first time during the period of time of the recording (e.g., a time that is concurrent with the capture of the video, audio, and/or 3D geometry information and/or concurrent with the rendering of CG content) and based on a second portion 619 of the stored time-ordered three-dimensional scene information from a second time during the period of time of the recording.

For example, 3D geometry information (e.g., depth sensor data from one or more depth sensors of electronic device 105 and/or 3D geometry information created from depth and/or video sensor data after processing) captured when the recording device views a front side of a physical object while a virtual cup is displayed on the physical object can be used for 3D reconstruction of the front side of the physical object. However, this view may not be sufficient for accurately reconstructing the rear side of the physical object. Accordingly, when the device is later moved to a position in which the rear side of the physical object can be viewed (e.g., by the sensors and/or cameras of the device), the 3D geometry information (e.g., additional depth sensor data from the one or more depth sensors of electronic device 105) captured at that time (e.g., second portion 619 of the 3D geometry information) can be used for the 3D reconstruction of the rest (e.g., the rear side) of the table. The device can be later moved to a position in which the rear side of the physical object can be viewed during a continuous recording of an XR experience, or at a discontinuous later time. For example, if the device (and/or another device) later begins capturing three-dimensional information at a discontinuous later time, the device may recognize one or more portions of the environment based on a comparison of current three-dimensional information with earlier recorded three-dimensional information, and can reconcile the front and back portions of a physical object in the current and earlier recorded information to update a three-dimensional reconstruction of the physical environment including the physical object. The first portion of the stored time-ordered three-dimensional scene information described above may be associated with a first position of the device at the first time, and the second portion 619 of the stored time-ordered three-dimensional scene information can be associated with a second position of the device at the second time.

FIG. 6 also shows how generating the three-dimensional reconstruction can include generating a portion of the three-dimensional reconstruction associated with a location in the scene based on a portion of the stored time-ordered three-dimensional scene information (e.g., 3D geometry track 612) and a portion of an additional stored time-ordered three-dimensional scene information from an additional device such as other devices 601 (e.g., as described above in connection with FIG. 4).

Figure 7:
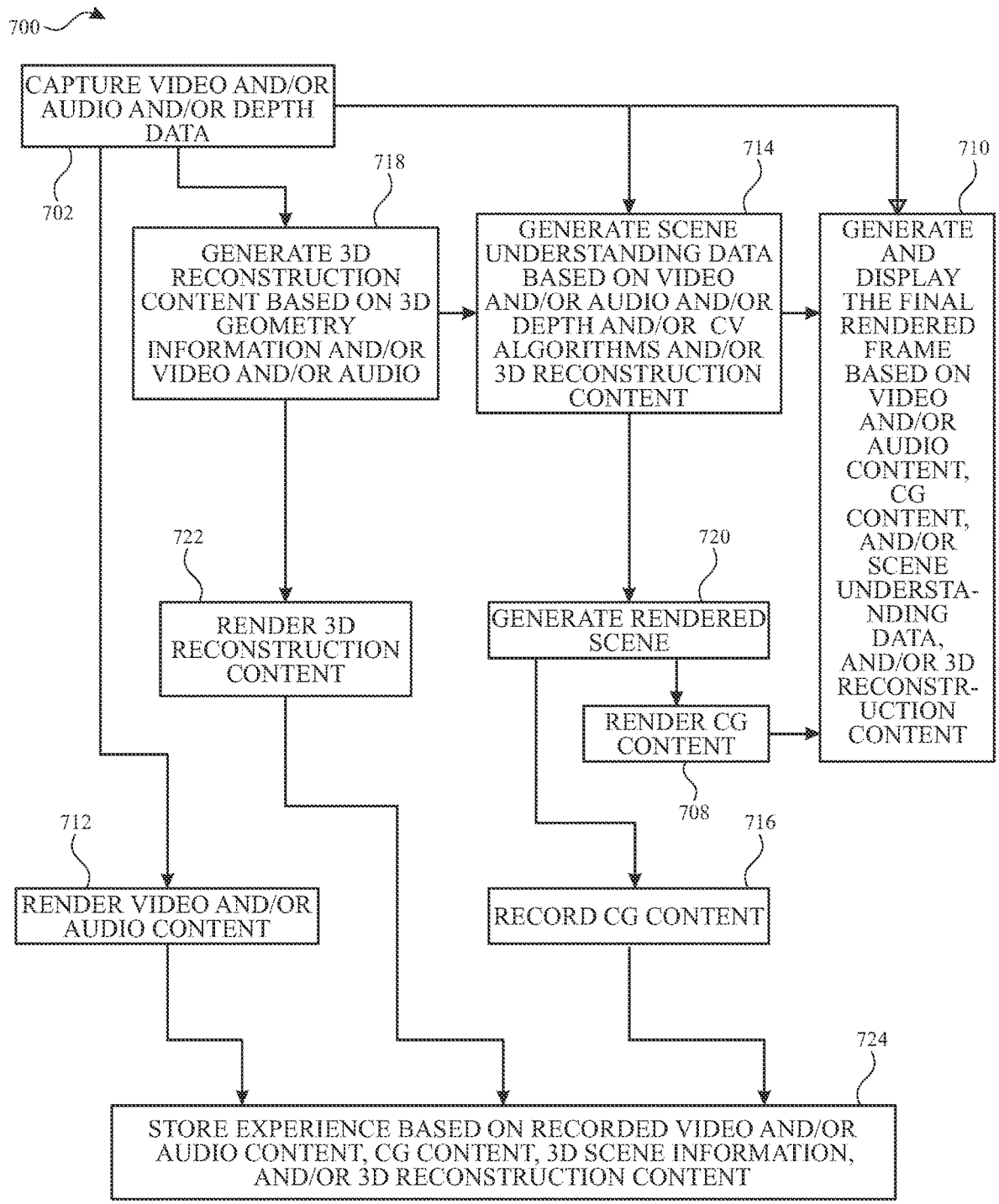
FIG. 7 illustrates a flow diagram of an example process for recording an extended reality experience in accordance with implementations of the subject technology.

FIG. 7 illustrates a flow diagram of an example process 700 for recording extended reality content in accordance with implementations of the subject technology. For explanatory purposes, the process 700 is primarily described herein with reference to the electronic device 105 of FIGS. 1 and 2. However, the process 700 is not limited to the electronic device 105 of FIGS. 1 and 2, and one or more blocks (or operations) of the process 700 may be performed by one or more other components of other suitable devices, including the electronic device 105, the electronic device 110, the electronic device 115, and/or the servers 120. Further for explanatory purposes, some of the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

As illustrated in FIG. 7, at block 702, video and/or audio from a physical environment may be captured (e.g., by electronic device 105). For example, over a period of time corresponding to a recording time, and with a camera of a device, a video of at least part of the environment can be captured. Over substantially the same period of time, with one or more microphones of the device, audio information (e.g., a spatial audio from multiple directions) from the environment may also be captured.

At block 702, 3D geometry information such as depth data for the environment may also be captured (e.g., using sensors 152 of electronic device 105). Capturing the 3D geometry information (e.g., sensor data from the sensors 152 and/or process depth data based on the sensor data from the sensors 152) may include capturing time-ordered three-dimensional scene information (e.g., depth information) for the environment over a period of time with at least one sensor of a device (e.g., electronic device 105) that is located in the environment. The 3D geometry information can be captured in one continuous track corresponding to the period of time, and/or during multiple discontinuous times before, during, and/or after the period of time. For example, the video and the 3D geometry information may include information representing a part of a wedding cake that is visible to an electronic device 105 in the physical environment 410 of FIG. 4 while the dancing couple dances. While other parts (e.g., a rear side) of the wedding cake may not be visible to the electronic device 105 during the dancing, the electronic device 105 may later capture video and/or 3D geometry information for other parts of the wedding cake that can be reconciled with the video and/or 3D geometry information representing the wedding cake that was captured during the dancing.

At block 712, some or all of the video and/or audio content may be stored (e.g., at electronic device 105, electronic device 110, electronic device 115, and/or servers 120). Storing the video and/or audio content may include storing the rendered video and/or audio content and/or additional video and/or audio content captured at block 702 in a video track 606 and an audio track 608 as described above in connection with FIG. 6 (e.g., to be used in generating, offline, the 3D reconstruction). At block 712, some or all of the 3D scene information captured at block 704 may also be stored. Storing the 3D scene information may include storing raw sensor data and/or storing processed sensor data such as sensor data processed to form depth information that describes the depths of surfaces, objects, etc. from the recording device throughout the period of time. Storing the 3D scene information may include storing the time-ordered three-dimensional scene information in a 3D geometry track 612 (e.g., aligned in time with video track 606 and/or audio track 608).

In the example of FIG. 7, at block 718, a reconstruction engine such as reconstruction engine 220 on electronic device 105 and/or reconstruction engine 225 of electronic device 115, may generate 3D reconstruction content based on the 3D geometry information (e.g., depth information/data) and/or the video and/or audio captured at block 702. The 3D reconstruction content may include (e.g., for each of one or more objects or other entities in the physical environment) a texture (e.g., one or more images obtained from and/or based the captured video) that is mapped to a mesh of the object/entity (e.g., as identified by and/or generated based on 3D geometry information from sensors 152). Generating the 3D reconstruction content may include providing the time-ordered three-dimensional scene information for the environment to a reconstruction engine, and generating a three-dimensional reconstruction of the environment including meshes, point clouds, or other three-dimensional representations of three-dimensional entities/objects in the three-dimensional reconstruction that are present in the environment. Generating a 3D reconstruction of an object (e.g., a wedding cake) in the environment can include utilizing video and/or 3D geometry (e.g., depth) information of the object from different perspectives captured at different times (e.g., throughout an XR experience such as throughout the night of the dance of the dancing couple of FIG. 4).

In the example of FIG. 7, at block 714, scene understanding data may be generated based on the video and/or audio and/or depth data captured at block 702, based on one or more computer vision (CV) algorithms, and/or based on the 3D reconstruction content generated at block 718.

At block 720, based on the scene understanding data, a rendered scene may be generated. In generating the rendered scene, some or all of the 3D reconstruction content (e.g., a portion of the three-dimensional reconstruction that corresponds to a scene that is in view of the recording device) and/or some or all of the video and/or audio content and/or the depth data (e.g., audio and/or video and/or depth data corresponding to the portion of the scene that is in view of the recording device), and/or computer-generated scene information based on some or all of the video and/or audio content and/or the depth data (e.g., audio and/or video and/or depth data corresponding to the portion of the scene that is in view of the recording device) may be rendered.

At block 708, computer-generated content (e.g., computer-generated content 402 and/or 404 of FIG. 4 and/or computer-generated content 502 of FIG. 5) may be rendered. Rendering the CG content may include generating, over substantially the same period of time and based at least in part on the rendered scene, time-ordered computer-generated content, and rendering the time-ordered computer generated content for display with the rendered video.

At block 710, a final rendered frame may be generated and displayed, based on the video and/or audio content, the rendered CG content, the scene understanding data, and/or the 3D reconstruction content. In rendering the final frame, some or all of the rendered video and/or audio content, the rendered CG content, the rendered scene, and/or the rendered 3D reconstruction content (e.g., a rendered portion of the 3D reconstruction content) is displayed (e.g., by display 302 of electronic device 105). For example, over substantially the same period of time, with a display of the device, the time-ordered computer-generated content may be displayed overlaid on the rendered scene and/or on a view of at least a portion of the environment. The view of the at least the portion of the environment may be a direct view through a transparent or translucent display, or a pass-through view generated by the display based on images of the environment captured by a camera of the device during the period of time.

At block 716, the CG content may be stored. Storing the CG content may include storing the time-ordered computer-generated content, aligned in time with the time-ordered three-dimensional scene information (e.g., 3D geometry track 612). For example, the time-ordered computer-generated content may be stored as a CG content track 610. The stored time-ordered computer-generated content may include snapshot frames and snapshot delta frames that allow the CG content that was displayed during recording, and/or CG content that was out of the field of view during the recording, to be re-rendered at playback from any viewpoint or position.

At block 722, some or all of the 3D reconstruction content may be stored. Storing the 3D reconstruction content may include storing a three-dimensional representation of the scene, objects and/or entities in the scene, textures and/or materials of the objects and/or entities, and/or image and/or audio data from the scene that allow portions of the reconstructed 3D scene that are present in the view of a playback device at a given playback time to re-rendered at playback from any viewpoint or position.

At block 724, an experience such as a 3D experience or an XR experience corresponding to the rendered video, audio, CG content, and/or 3D reconstruction content displayed during the recording period of time may be stored, based on the recorded video and/or audio content, the recorded CG content, the recorded 3D scene information, and/or the recorded 3D reconstruction content. Storing the experience may include storing the video track 606, the audio track 608, the CG content track 610, the 3D geometry track 612, and/or the 3D reconstruction in an XR recording 600.

In the example of FIG. 7, the 3D reconstruction is generated during the same period of time during which the XR experience is displayed and recorded, and may be used in rendering frames as shown. However, it should be appreciated that 3D reconstruction operations can be performed after the recording time and later added to the recorded XR experience for playback.

Figure 8:
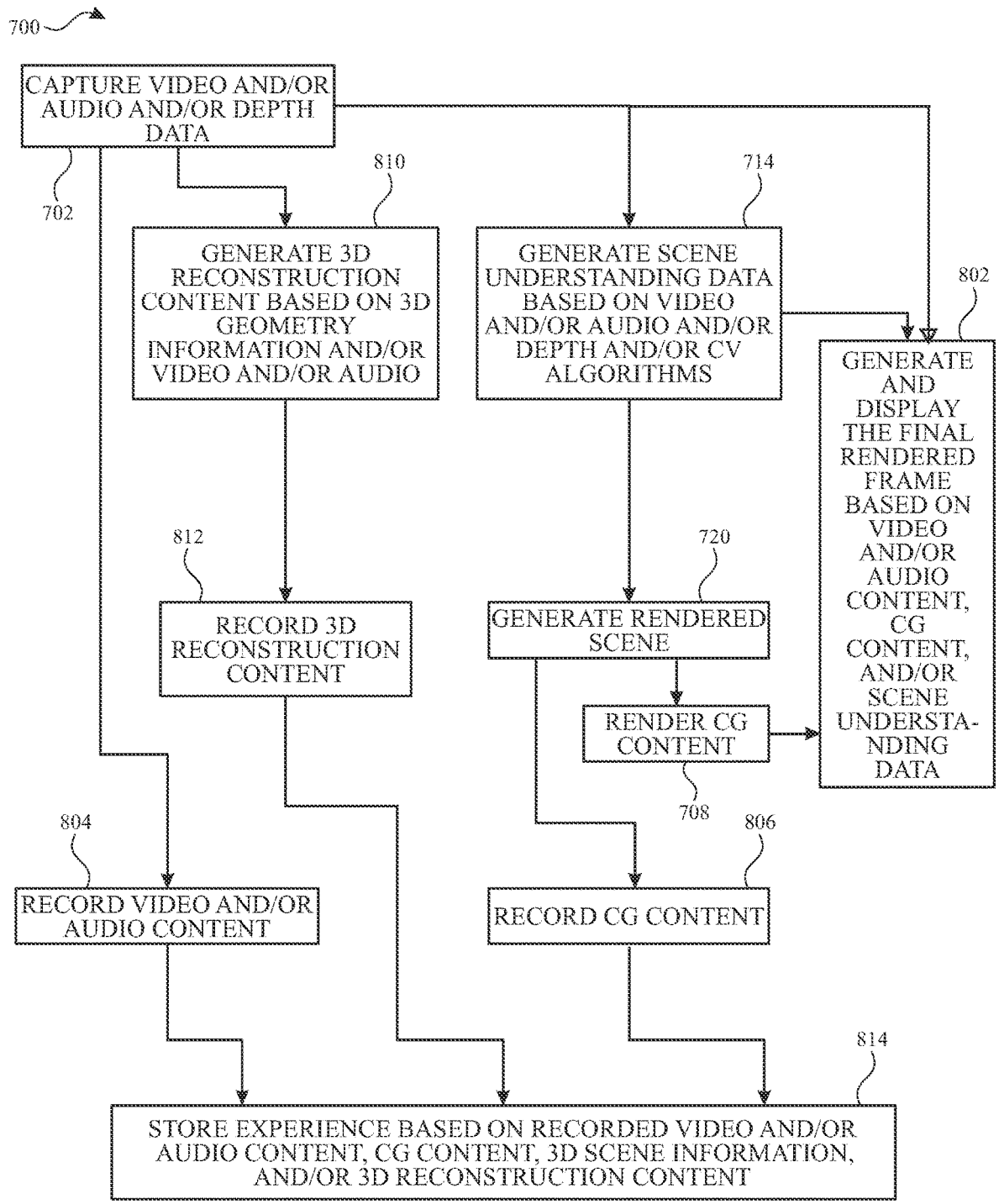
FIG. 8 illustrates a flow diagram of another example process for recording an extended reality experience in accordance with implementations of the subject technology.

FIG. 8 illustrates a flow diagram of an example process 800 for recording extended reality content that includes generating a 3D reconstruction separately from the active display and recording operations during the recorded in accordance with implementations of the subject technology. For explanatory purposes, the process 800 is primarily described herein with reference to the electronic device 105 and the server 120 of FIGS. 1 and 2. However, the process 800 is not limited to the electronic device 105 and the server 120 of FIGS. 1 and 2, and one or more blocks (or operations) of the process 800 may be performed by one or more other components of other suitable devices, including the electronic device 105, the electronic device 110, the electronic device 115, and/or the servers 120. Further for explanatory purposes, some of the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

As shown in the example of FIG. 8, after generating the scene understanding data at block 714, generating the rendered scene at block 720, and rendering the CG content at block 708, a device such as electronic device 105 may generate and display a final frame, based on the video and/or audio content, the rendered CG content, and/or the scene understanding data. In this example, the 3D reconstruction content is not used in the display of the final frame. In this example, the CG content may be displayed over the rendered scene, over a pass-through video view of the scene or over a direct view of the scene through a transparent or translucent display.

At block 804, some or all of the video and/or audio content may be stored (e.g., at electronic device 105, electronic device 110, electronic device 115, and/or servers 120). Storing the video and/or audio content may include storing the rendered video and/or audio content and/or additional video and/or audio content captured at block 702 in a video track 606 and an audio track 608 as described above in connection with FIG. 6 (e.g., for later use in generating a 3D reconstruction of the environment).

At block 806, the CG content may be stored. Storing the CG content may include storing time-ordered computer-generated content, aligned in time with the time-ordered three-dimensional scene information (e.g., 3D geometry track 612). For example, the time-ordered computer-generated content may be stored as a CG content track 610. The stored the time-ordered computer-generated content may include snapshot frames and snapshot delta frames that allow the CG content that was displayed during the recording, and/or CG content that was not displayed during the recording (e.g., due to the field of view of the recording user during the recording) to be re-rendered at playback from any viewpoint or position.

At block 810, after the recording/displaying of the experience, a reconstruction engine such as reconstruction engine 225 on server 120, reconstruction engine 220 on electronic device 105 and/or reconstruction engine 225 of electronic device 115, may generate 3D reconstruction content based on the 3D geometry information and/or the video and/or audio captured at block 702. Generating the 3D reconstruction content may include providing the time-ordered three-dimensional scene information for the environment to a reconstruction engine and generating a three-dimensional reconstruction of the environment that identifies the shape, texture, material, animation, etc. of three-dimensional entities in the three-dimensional reconstruction.

At block 812, some or all of the 3D reconstruction content may be stored. Storing the 3D reconstruction content may include storing meshes, textures, materials, animations, point cloud representations, etc. that allow portions of the physical environment of the recording device during the recording period of time to be virtually rendered at playback from any viewpoint or position.

At block 814, an experience such as a 3D experience or an XR experience corresponding to the rendered video, audio, CG content, and/or 3D reconstruction content displayed during the recording period of time may be stored, based on the recorded video and/or audio content, the recorded CG content, the recorded 3D scene information, and/or the recorded 3D reconstruction content. Storing the experience may include storing the video track 606, the audio track 608, the CG content track 610, the 3D geometry track 612, and/or the 3D reconstruction in an XR recording 600.

Figure 9:
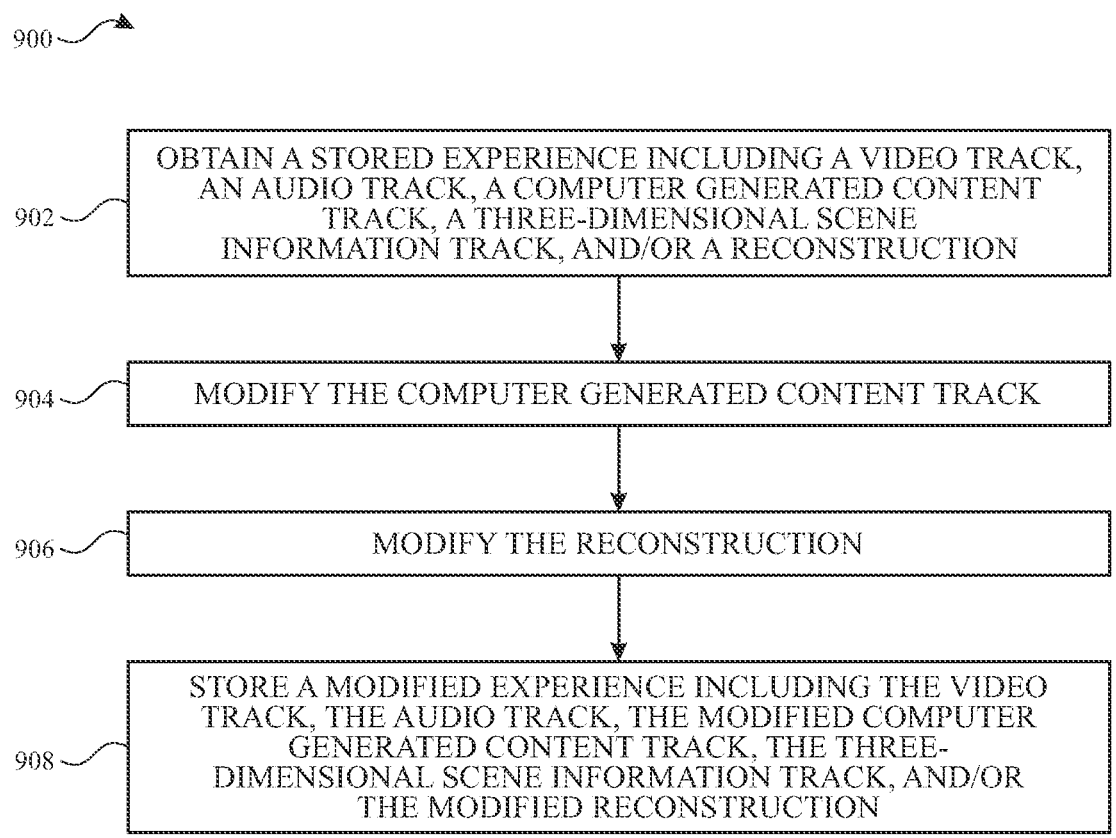
FIG. 9 illustrates a flow diagram of an example process for editing an extended reality experience in accordance with implementations of the subject technology.

FIG. 9 illustrates a flow diagram of an example process 900 for editing a recording of extended reality content in accordance with implementations of the subject technology. For explanatory purposes, the process 900 is primarily described herein with reference to the electronic device 105 and the server 120 of FIGS. 1 and 2. However, the process 900 is not limited to the electronic device 105 and the server 120 of FIGS. 1 and 2, and one or more blocks (or operations) of the process 900 may be performed by one or more other components of other suitable devices, including the electronic device 105, the electronic device 110, the electronic device 115, and/or the servers 120. Further for explanatory purposes, some of the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

At block 902, a stored experience such as a recorded 3D experience or XR experience including a video track, an audio track, a computer-generated content track, a three-dimensional scene information track, and/or a reconstruction (e.g., an XR recording 600) may be obtained (e.g., by electronic device 105, electronic device 110, electronic device 115, and/or server 120).

At block 904, the computer-generated content track may be modified (e.g., to replace CG content such as a virtual bear that was rendered during recording with other CG content such as a virtual dinosaur and/or to add or remove CG content).

At block 906, the 3D reconstruction may be modified (e.g., for hole filling and fill in missing geometry, etc.).

At block 908, a modified experience including the modified computer-generated content track, and/or the modified reconstruction can be stored as a modified XR recording.

Figure 10:
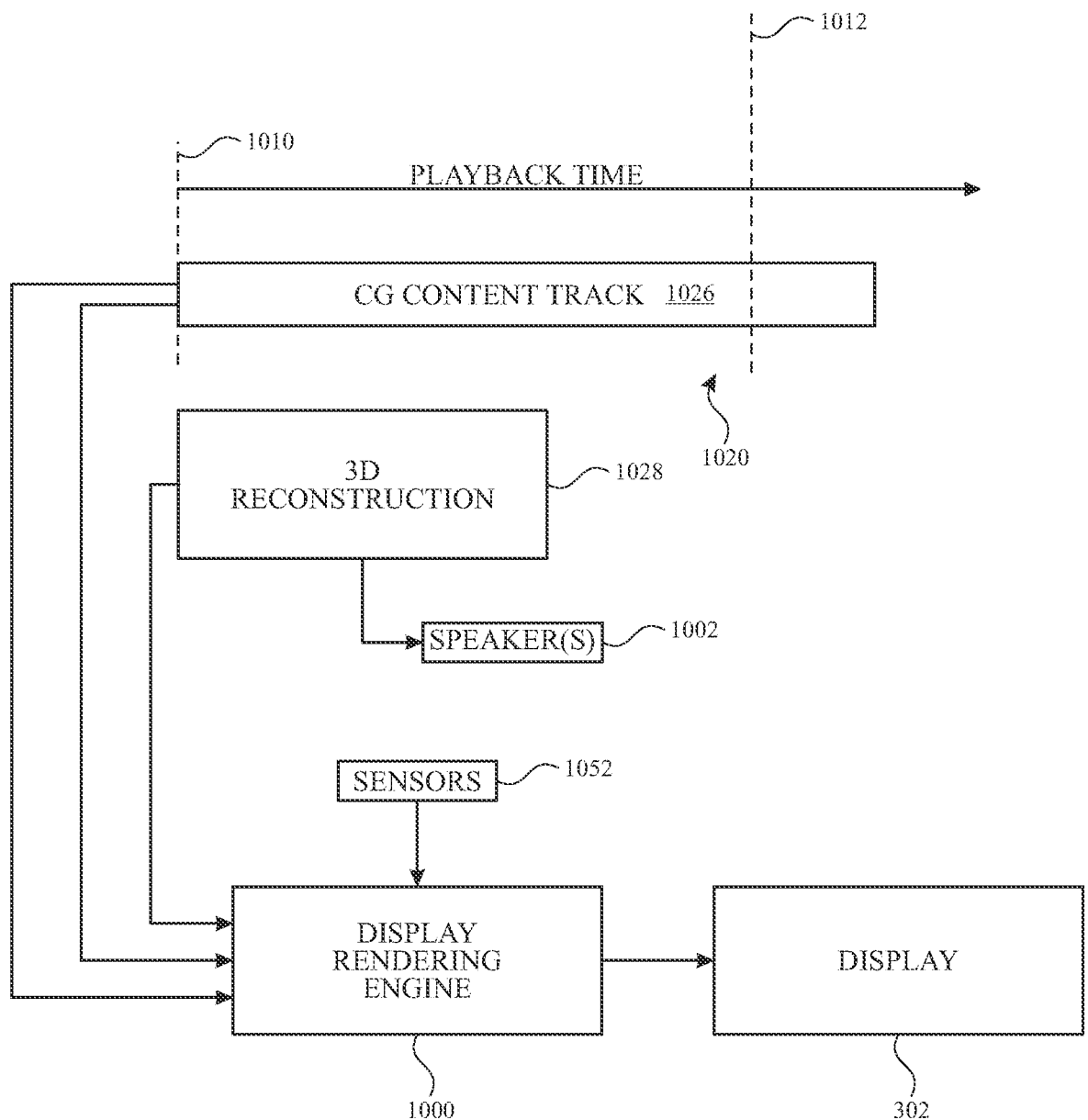
FIG. 10 illustrates example features of a recorded extended reality experience in accordance with implementations of the subject technology.

FIG. 10 illustrates an example of a modified XR recording 1020 that can be stored and/or obtained for playback. As shown in FIG. 10, modified XR recording 1020 includes a CG content track 1026 and a 3D reconstruction 1028, each stored in the modified XR recording 1020. In the example of FIG. 10, the 3D geometry track 612 is not included in the recording to be used for playback, as the 3D geometry information (e.g., and the video and/or audio information) needed for playback has been encoded in the 3D reconstruction 1028.

As illustrated in FIG. 10, playback of modified XR recording 1020 may be performed, beginning at a start time 1010, by a playback device (e.g., an electronic device 105) having sensors 1052 (e.g., one or more of sensors 152 described herein), a display 302, and a display rendering engine 1000 (e.g., implemented with processing circuitry 306). In the example of FIG. 10, during playback of modified XR recording 1020, CG content track 1026 and relevant portions of the 3D reconstruction 1028 may be provided to display rendering engine 1000 along with sensor data from sensors 1052 that indicate a position, motion, and/or orientation of the playback device and/or other information such as eye tracking information and/or other biometric information of the user/wearer of the device.

Based on the position, orientation, and/or motion of the device, and/or the other information from sensors 1052, and based on a playback time relative to the start time 1010 of the recording (and/or any other time stamp 1012 that indicates a point in time in the recording), display rendering engine 1000 may render some or all of the CG content based on the CG content track, and the relevant portions of the 3D reconstruction content.

Rendering the CG content may include obtaining, from a CG content library, one or more meshes, textures, and/or materials for one or more virtual objects identified in one or more snapshot frames in the CG content track 1026. Rendering the 3D reconstruction content may include obtaining, from a reconstruction library, one or more meshes, textures, and/or materials for one or more entities identified in portions of the 3D reconstruction 1028 that are in the field of view of the viewer at a given time. Audio information (e.g., 3D audio information stored as a part of 3D reconstruction 1028) may be provided (e.g., via an audio rendering engine or other audio processor) to one or more speakers such as speakers 1002.

In accordance with aspects of the disclosure, playing back an experience corresponding to the period of time of a recording, with the device used for recording or another device, over a later period of time, may include associating a first position of the device or the other device with a location in the three-dimensional reconstruction. The first position may be the position of the device at the start of playback and may be associated to the position of a recording device at the start of recording of the experience. Over the later period of time, a reconstruction of a portion of the environment of the recording can be rendered based on the stored 3D reconstruction 1028 and a tracked position of the device or the other device (e.g., using sensors 1052). Over the later period of time, additional computer-generated content can also be rendered based on the stored 3D reconstruction 1028, the stored time-ordered computer-generated content track (e.g., CG content track) 1026, and the tracked position of the device or the other device. The additional computer-generated content may be the modified computer-generated content indicated in the CG content track 1026.

Rendering the computer-generated content during the period of time of the recording may include rendering the computer-generated content from a first viewing angle associated with a position of the device at the time of the rendering of the computer-generated content. In contrast, rendering the additional computer-generated content during the later period of time may include rendering the computer-generated content that was rendered during the period of time of the recording, from a second viewing angle that is different from the first viewing angle and based on the tracked position of the device or the other device. Additional CG content that was not rendered during the period of time (e.g., because the additional CG content was not in the field of view of the recording user) may also be rendered during the later period of time (e.g., due to a different viewing angle of the viewing user).

Rendering the computer-generated content that was rendered during the period of time of the recording, from the second viewing angle that is different from the first viewing angle and based on the tracked position of the device or the other device may include obtaining a current tracked position of the device or the other device at a current time during the later period of time corresponding to the playback, obtaining a mesh, a texture, or a material associated with the computer-generated content based on the time-ordered computer-generated content track, the current time, and the obtained current tracked position, and rendering the computer-generated content that was rendered during the period of time, from the second viewing angle based on the obtained mesh, texture, or material.

Figure 11:
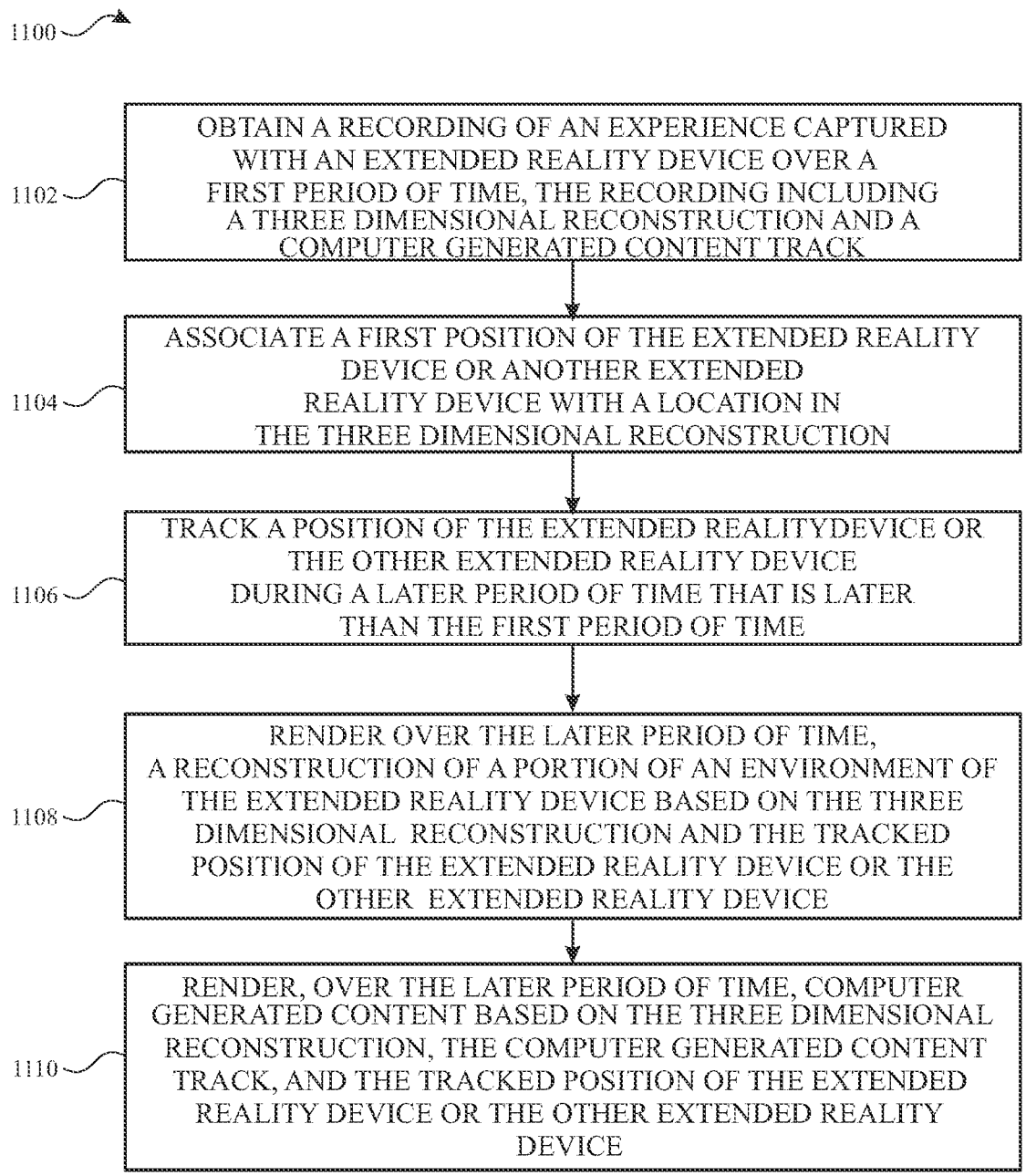
FIG. 11 illustrates a flow diagram of an example process for playing back a recorded extended reality experience in accordance with implementations of the subject technology.

FIG. 11 illustrates a flow diagram of an example process 1100 for playback of a recording of extended reality content in accordance with implementations of the subject technology. For explanatory purposes, the process 1100 is primarily described herein with reference to the electronic device 105 of FIGS. 1 and 2. However, the process 1100 is not limited to the electronic device 105 of FIGS. 1 and 2, and one or more blocks (or operations) of the process 1100 may be performed by one or more other components of other suitable devices, including the electronic device 105, the electronic device 110, and/or the server 120. Further for explanatory purposes, the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

As illustrated in FIG. 11, at block 1102, a playback device obtains a recording of an experience captured with an extended reality device over a first period of time, the recording including a three-dimensional reconstruction such as 3D reconstruction 1028, and a computer-generated content track such as CG content track 1026.

At block 1104, a first position of the extended reality device or another extended reality device may be associated with a location in a three-dimensional reconstruction. The location in the three-dimensional reconstruction may correspond to a physical location in a physical environment of a recording device when the recording was generated.

At block 1106, a position of the extended reality device or the extended reality device may be tracked during the later period of time. Tracking the position may also include tracking the orientation, movement, and/or other information such as biometric information of a user.

At block 1108, over the later period of time, a reconstruction of a portion of an environment of the extended reality device is rendered based on the three-dimensional reconstruction and the tracked position of the extended reality device or the extended reality device.

Rendering, over the later period of time, the reconstruction of the portion of the environment of the extended reality device based on the three-dimensional reconstruction and the tracked position of the extended reality device or the extended reality device may include obtaining a mesh, a texture, or a material associated with an entity in the portion of the environment based on the three-dimensional reconstruction, a playback time, and a current tracked position corresponding to the playback time, and rendering the reconstruction of the portion of the environment based on the mesh, the texture, or the material.

At block 1110, over the later period of time, computer-generated content can be rendered based on the three-dimensional reconstruction, the computer-generated content track, and the tracked position of the extended reality device or the extended reality device.

Rendering, over the later period of time, the computer-generated content based on the three-dimensional reconstruction, the computer-generated content track, and the tracked position of the extended reality device or the extended reality device may include obtaining an additional mesh, an additional texture, or an additional material associated with the computer-generated content based on the computer-generated content track, the playback time, and the current tracked position corresponding to the playback time, and rendering the computer-generated content based on the additional mesh, the additional texture, or the additional material.

The recording may include dynamic content that changes over time. For example, the computer-generated content may be dynamic content that changes over time based on time-ordered features of the computer-generated content track. In some operational scenarios, playing back the recording may include receiving a request to pause the playing of the recording (e.g., when the user actuates a real or virtual "pause" button or speaks the word "pause"). Responsive to the request, the playback device may pause the rendering of the changes over time based on the time-ordered features of the computer-generated content track and/or other dynamic features of the recording (e.g., by freezing the dancing pose of the dancing couple in FIG. 4 as displayed at the time of the pause). While pausing the rendering of the changes over time based on time-ordered features of the computer-generated content track and/or other dynamic features of the recording, a static representation of the computer-generated content and/or other dynamic features of the recording (e.g., the dancing couple in a frozen pose) can be displayed based on a portion of the recording (e.g., the computer-generated content track) corresponding to a time of the request to pause the playing of the recording. While the changes over time of the recording are paused, movement of the extended reality device (e.g., the playback device) may be detected (e.g., using sensors 1052). The rendering of the static representation of the computer-generated content and/or other dynamic features of the recording may then be modified based on the movement. For example, the view of the rendered dancing couple in the frozen pose may be rotated as the user physically walks around the frozen view of the couple.

The device may then receive a request (e.g., an unselecting of a pause button) to continue the playing of the recording and resume the rendering of the changes over time based on the time-ordered features of the computer-generated content track and/or other dynamic features of the recording (e.g., by resuming the playback of the recorded dancing, but from the new viewpoint of the user). Resuming the rendering may include rendering the changes over time, relative to the modified rendering of the static representation at a time of the request to continue, based on the time-ordered features of the computer-generated content track.

As described above, one aspect of the present technology is the gathering and use of data available from specific and legitimate sources for XR recording. The present disclosure contemplates that in some instances, this gathered data may include personal information data that uniquely identifies or can be used to identify a specific person. Such personal information data can include video data, three-dimensional geometry data, demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for recording of XR experiences.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR recording, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 12:
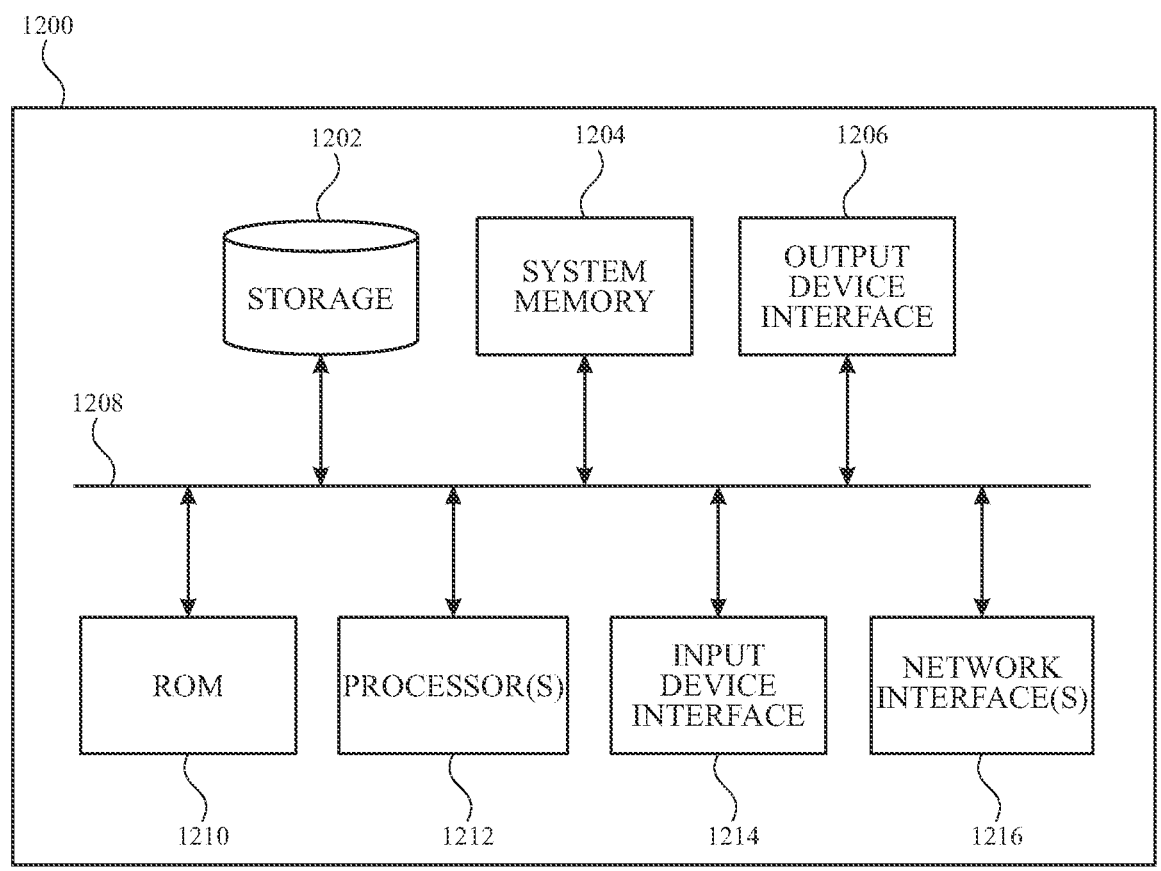
FIG. 12 illustrates an electronic system with which one or more implementations of the subject technology may be implemented.

FIG. 12 illustrates an electronic system 1200 with which one or more implementations of the subject technology may be implemented. The electronic system 1200 can be, and/or can be a part of, the electronic device 105, the handheld electronic device 104, the electronic device 110, the electronic device 115, and/or the server 120 as shown in FIG. 1. The electronic system 1200 may include various types of computer readable media and interfaces for various other types of computer readable media. The electronic system 1200 includes a bus 1208, one or more processing unit(s) 1212, a system memory 1204 (and/or buffer), a ROM 1210, a permanent storage device 1202, an input device interface 1214, an output device interface 1206, and one or more network interfaces 1216, or subsets and variations thereof.

The bus 1208 collectively represents all system, peripheral, and chipset buses that communicatively connect the numerous internal devices of the electronic system 1200. In one or more implementations, the bus 1208 communicatively connects the one or more processing unit(s) 1212 with the ROM 1210, the system memory 1204, and the permanent storage device 1202. From these various memory units, the one or more processing unit(s) 1212 retrieves instructions to execute and data to process in order to execute the processes of the subject disclosure. The one or more processing unit(s) 1212 can be a single processor or a multi-core processor in different implementations.

The ROM 1210 stores static data and instructions that are needed by the one or more processing unit(s) 1212 and other modules of the electronic system 1200. The permanent storage device 1202, on the other hand, may be a read-and-write memory device. The permanent storage device 1202 may be a non-volatile memory unit that stores instructions and data even when the electronic system 1200 is off. In one or more implementations, a mass-storage device (such as a magnetic or optical disk and its corresponding disk drive) may be used as the permanent storage device 1202.

In one or more implementations, a removable storage device (such as a floppy disk, flash drive, and its corresponding disk drive) may be used as the permanent storage device 1202. Like the permanent storage device 1202, the system memory 1204 may be a read-and-write memory device. However, unlike the permanent storage device 1202, the system memory 1204 may be a volatile read-and-write memory, such as random access memory. The system memory 1204 may store any of the instructions and data that one or more processing unit(s) 1212 may need at runtime. In one or more implementations, the processes of the subject disclosure are stored in the system memory 1204, the permanent storage device 1202, and/or the ROM 1210 (which are each implemented as a non-transitory computer-readable medium). From these various memory units, the one or more processing unit(s) 1212 retrieves instructions to execute and data to process in order to execute the processes of one or more implementations.

The bus 1208 also connects to the input and output device interfaces 1214 and 1206. The input device interface 1214 enables a user to communicate information and select commands to the electronic system 1200. Input devices that may be used with the input device interface 1214 may include, for example, alphanumeric keyboards and pointing devices (also called "cursor control devices"). The output device interface 1206 may enable, for example, the display of images generated by electronic system 1200. Output devices that may be used with the output device interface 1206 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 12, the bus 1208 also couples the electronic system 1200 to one or more networks and/or to one or more network nodes, such as the electronic device 110 shown in FIG. 1, through the one or more network interface(s) 1216. In this manner, the electronic system 1200 can be a part of a network of computers (such as a LAN, a wide area network ("WAN"), or an Intranet, or a network of networks, such as the Internet. Any or all components of the electronic system 1200 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

In accordance with aspects of the disclosure, a method is provided that includes capturing, over a period of time with at least one sensor of a device that is located in an environment, time-ordered three-dimensional scene information for the environment. The method also includes generating, over substantially the same period of time and based at least in part on the time-ordered three-dimensional scene information, time-ordered computer-generated content. The method also includes displaying, over substantially the same period of time with a display of the device, at least a portion of the time-ordered computer-generated content overlaid on a view of at least a portion of the environment. The method also includes storing the time-ordered three-dimensional scene information. The method also includes storing, aligned in time with the time-ordered three-dimensional scene information, the time-ordered computer-generated content.

In accordance with aspects of the disclosure, a method is provided that includes obtaining a recording of an experience captured with an extended reality device over a first period of time. The recording includes a three-dimensional reconstruction, and a computer-generated content track. The method also includes playing the recording over a later period of time by: associating a first position of the extended reality device or another extended reality device with a location in a three-dimensional reconstruction; tracking a position of the extended reality device or the extended reality device during the later period of time; rendering, over the later period of time, a reconstruction of a portion of an environment of the extended reality device based on the tracked position of the extended reality device or the extended reality device; and rendering, over the later period of time, computer-generated content based on the three-dimensional reconstruction, the computer-generated content track, and the tracked position of the extended reality device or the extended reality device.

In accordance with aspects of the disclosure, a method is provided that includes obtaining a recording of an extended reality experience captured over a first period of time, the recording including a three-dimensional reconstruction of a physical environment, and a computer-generated content track. The method also includes playing the recording over a later period of time by: associating a first position of an extended reality device with a location in the three-dimensional reconstruction; tracking a position of the extended reality device during the later period of time; rendering, over the later period of time, a portion of the three-dimensional reconstruction corresponding to a field of view of the extended reality device based on the tracked position of the extended reality device; and rendering, over the later period of time, computer-generated content based on the three-dimensional reconstruction, the computer-generated content track, and the tracked position of the extended reality device.

In accordance with aspects of the disclosure, a non-transitory computer-readable medium is provided including instructions, which when executed by a computing device, cause the computing device to perform operations that includes capturing, over a period of time with at least one sensor of a device that is located in an environment, time-ordered three-dimensional scene information for the environment. The operations also include generating, over substantially the same period of time and based at least in part on the time-ordered three-dimensional scene information, time-ordered computer-generated content. The operations also include displaying, over substantially the same period of time with a display of the device, at least a portion of the time-ordered computer-generated content overlaid on a view of at least a portion of the environment. The operations also include storing the time-ordered three-dimensional scene information and storing, aligned in time with the time-ordered three-dimensional scene information, the time-ordered computer-generated content.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term web site, as used herein, may include any aspect of a web site, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A method, comprising:
   obtaining a recording of an extended reality experience captured over a first period of time, the recording comprising:
   a three-dimensional reconstruction of a physical environment, and
   a computer-generated content track; and
   playing the recording over a later period of time by:
   associating a first position of an extended reality device with a location in the three-dimensional reconstruction;

tracking a position of the extended reality device during the later period of time;

rendering, over the later period of time, a portion of the three-dimensional reconstruction corresponding to a field of view of the extended reality device based on the tracked position of the extended reality device; and rendering, over the later period of time, computer-generated content based on the three-dimensional reconstruction, the computer-generated content track, and the tracked position of the extended reality device, wherein the computer-generated content is dynamic content that changes over time based on time-ordered features of the computer-generated content track, and wherein the method further comprises:

receiving a request to pause the playing of the recording;

pausing the rendering of the changes over time based on the time-ordered features of the computer-generated content track;

while pausing the rendering of the changes over time based on time-ordered features of the computer-generated content track:

rendering a static representation of the computer-generated content based on a portion of the computer-generated content track corresponding to a time of the request to pause the playing of the recording;

detecting movement of the extended reality device;

modifying the rendering of the static representation of the computer-generated content based on the movement; and receiving a request to continue the playing of the recording; and resuming the rendering of the changes over time based on the time-ordered features of the computer-generated content track.

2. The method of claim 1, wherein the field of view of the extended reality device comprises a direct view through a transparent or translucent display, or a pass-through view generated by an opaque display based on images of the physical environment captured by a camera of the extended reality device during the later period of time.

3. The method of claim 1, further comprising modifying the three-dimensional reconstruction of the physical environment.

4. The method of claim 1, further comprising rendering, over the later period of time, additional computer-generated content that was not rendered during the first period of time, based on the three-dimensional reconstruction of the physical environment, the computer-generated content track, and the tracked position of the extended reality device.

5. The method of claim 1, wherein resuming the rendering comprises rendering the changes over time, relative to the modified rendering of the static representation at a time of the request to continue, based on the time-ordered features of the computer-generated content track.

6. The method of claim 1, wherein rendering, over the later period of time, the reconstruction of the portion of the three-dimensional reconstruction based on the tracked position of the extended reality device comprises:

obtaining a mesh, a texture, or a material associated with an entity in the portion of the physical environment based on the three-dimensional reconstruction, a current playback time, and a current tracked position corresponding to the current playback time; and rendering the reconstruction of the portion of the physical environment based on the mesh, the texture, or the material.

7. The method of claim 6, wherein rendering, over the later period of time, the computer-generated content based on the three-dimensional reconstruction, the computer-generated content track, and the tracked position of the extended reality device comprises:

obtaining an additional mesh, an additional texture, or an additional material associated with the computer-generated content based on the computer-generated content track, the current playback time, and the current tracked position corresponding to the current playback time; and rendering the computer-generated content based on the additional mesh, the additional texture, or the additional material.

8. The method of claim 1, wherein the three-dimensional reconstruction is based, in part, on a video track and an audio track obtained during the first period of time.

9. A non-transitory computer-readable medium storing instructions, which when executed by a computing device, cause the computing device to perform operations comprising:

obtaining, by the computing device, a recording of an extended reality experience captured over a first period of time and including dynamic content that changes over time;

playing the recording over a later period of time by rendering the changes over time of the dynamic content;

receiving a request to pause the playing of the recording;

pausing the rendering of the changes over time of the dynamic content responsive to the request;

while pausing:

rendering a static representation of the dynamic content based on a portion of the dynamic content corresponding to a time of the request to pause the playing of the recording;

detecting movement of the computing device;

modifying the rendering of the static representation of the dynamic content based on the movement; and receiving a request to continue the playing of the recording; and resuming the rendering of the changes over time of the dynamic content responsive to the request to continue.

10. The non-transitory computer-readable medium of claim 9, wherein the dynamic content includes dynamic video content, dynamic audio content, and dynamic computer-generated content.

11. The non-transitory computer-readable medium of claim 10, wherein the movement of the computing device includes movement around a frozen representation of a portion of the dynamic video content.

12. The non-transitory computer-readable medium of claim 11, wherein modifying the rendering of the static representation of the dynamic content based on the movement comprises rotating the frozen representation of the portion of the dynamic video content while the movement of the computing device includes movement around the frozen representation of the portion of the video content.

13. The non-transitory computer-readable medium of claim 12, wherein pausing the rendering of the changes over time of the dynamic content comprises pausing output of the dynamic audio content.

14. The non-transitory computer-readable medium of claim 10, wherein modifying the rendering of the static representation of the dynamic content based on the movement comprises rotating a frozen representation of a portion of the dynamic computer-generated content while the movement of the computing device includes movement around the frozen representation of the portion of the dynamic computer-generated content.

15. An electronic device, comprising:
a memory; and
one or more processors configured to:
    obtain a recording of an extended reality experience captured over a first period of time and including dynamic content that changes over time;
    play the recording over a later period of time by rendering of the changes over time of the dynamic content; and
    while the recording is played over the later period of time:
        detect movement of the electronic device;
        modify, based on the movement, rendering of the changes over time of the dynamic content;
        pause the rendering of the changes over time of the dynamic content;
        detect additional movement of the electronic device while the rendering is paused; and
        while the rendering is paused, modify, based on the additional movement, the paused rendering of the changes over time of the dynamic content.

16. The electronic device of claim 15, wherein the one or more processors are configured to render the changes over time of the dynamic content by rendering a first portion of the dynamic content from a first viewing angle associated with a position of the electronic device at a time of the rendering of the first portion of the dynamic content.

17. The electronic device of claim 16, wherein the one or more processors are configured to modify the rendering of the changes over time of the dynamic content based on the movement, in part, by rendering a second portion of the dynamic content from a second viewing angle that is different from the first viewing angle due to the movement.

18. The electronic device of claim 15, wherein the dynamic content includes dynamic video content, dynamic audio content, and dynamic computer-generated content.

19. The electronic device of claim 15, wherein the one or more processors are configured to render the changes over time of the dynamic content, in part, by:
    obtaining a mesh, a texture, or a material associated with an entity in a three-dimensional reconstruction of a physical environment of the electronic device or another electronic device during the first period of time; and
    rendering a reconstruction of the entity based on the mesh, the texture, or the material.

20. The electronic device of claim 15, wherein the one or more processors are further configured to receive, prior to pausing the rendering, a user request to pause the rendering.

21. The electronic device of claim 15, wherein the one or more processors are configured to modify the rendering of the changes over time of the dynamic content based on the movement, in part, by omitting, from the rendering of the changes over time of the dynamic content and based on the movement, a portion of computer-generated content that is included in the recording.

22. The electronic device of claim 21, wherein the portion of the computer-generated content that is included in the recording and omitted from the rendering comprises a portion of the computer-generated content that was within a field of view of a recording device that obtained the recording over the first period of time, and is outside of a field of view of the electronic device due to the movement.

23. The electronic device of claim 22, further comprising an inertial sensor, wherein the one or more processors are configured to detect the movement by detecting a walking motion of a user of the electronic device using the inertial sensor.

24. The electronic device of claim 23, wherein the one or more processors are configured to modify the rendering of the changes over time of the dynamic content by rotating the rendering of the changes over time of a rendered element of the dynamic content as the user walks around the rendered element.

25. The electronic device of claim 15, wherein the recording comprises a three-dimensional reconstruction of a physical environment.

* * * * *